Nov. 17, 1942.  J. F. SCHILLER  2,302,262
APPARATUS FOR STERILIZING, PURIFYING, AND DEHYDRATING GAS
Filed June 10, 1939
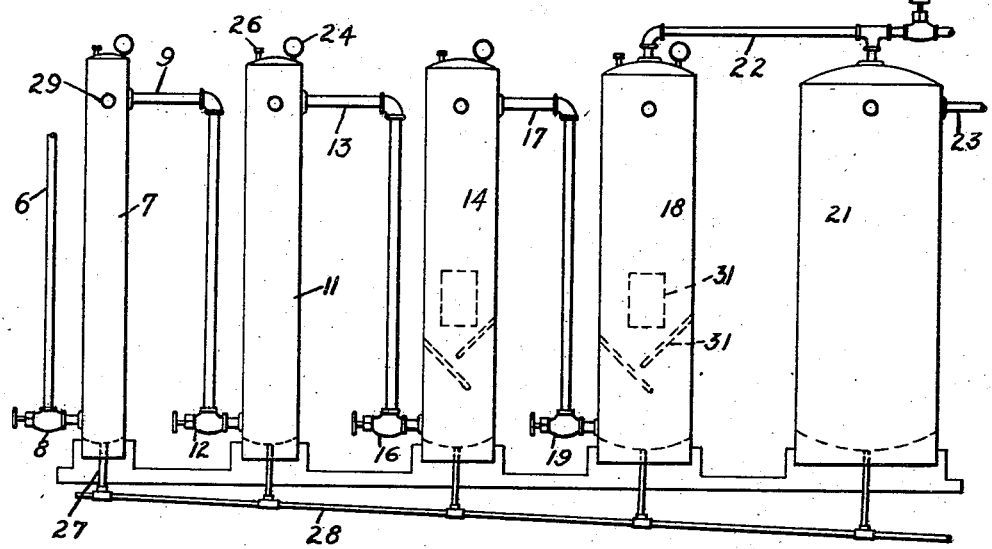
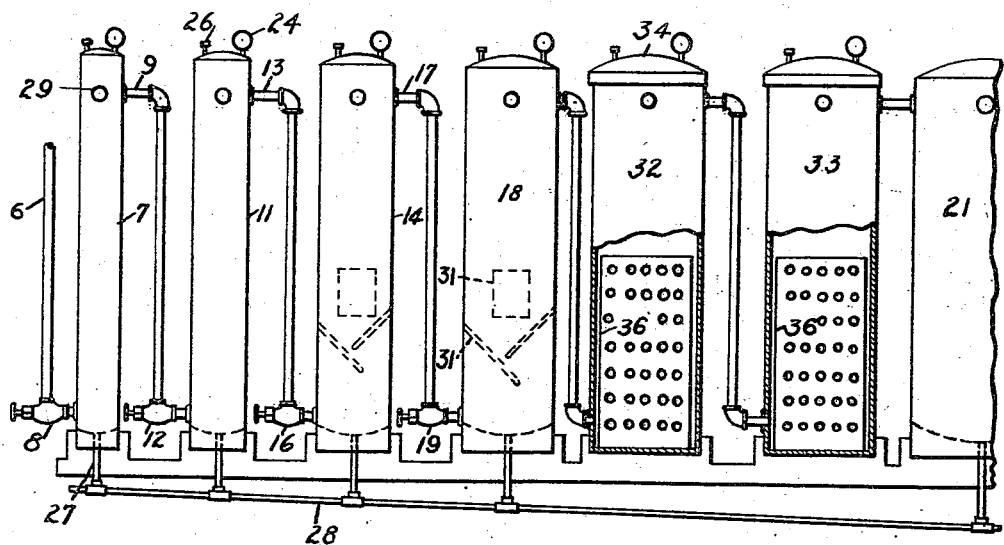
INVENTOR
JOSEPH F. SCHILLER
BY
ATTORNEY Patented Nov. 17, 1942

2,302,262

UNITED STATES PATENT OFFICE 2,302,262

APPARATUS FOR STERILIZING, PURIFYING, AND DEHYDRATING GAS

Joseph F. Schiller, Drexel Hill, Pa.

Application June 10, 1939, Serial No. 278,448

1 Claim. (Cl. 62—175.5)

This invention relates to the treatment of gases and more particularly to the sterilization, purification and dehydration of gases for commercial use.

Many gases used for different purposes are impregnated with living organisms, are odoriferous and contain an abnormal amount of moisture, and the present invention is designed to successfully sterilize, purify and dehydrate gases by a single operation.

In the manufacture of carbon dioxide for the manufacture of dry ice, it has been found that the gas generated from the mash ordinarily has a very repugnant odor and contains an abnormal amount of moisture. As a matter of fact, carbon dioxide for this purpose has been tested and found to contain normally anywhere between one hundred and fifty and eight hundred milligrams of water or moisture per cubic foot. This moisture is, of course, objectionable from many standpoints, and it has been found that it is essential to remove this moisture insofar as possible before the final operation of using the gas for forming the dry ice.

Many different systems have been employed for extracting moisture chemically, and these have been more or less efficient. It has been found that chemical treatment of carbon dioxide gas is highly unsatisfactory for removing odors. These odors, when carried into the dry ice, often make the same unfit for many uses in that the odors will contaminate the particular materials the dry ice is intended to keep cold.

It is also apparent that when the carbon dioxide is impregnated with an excess of living organisms which are not effected by low temperatures that when the ice gives off vapors these organisms may be transferred to food and other materials, and thus impregnate such food and material with an excess of bacteria.

The present system deals primarily with the physical treatment of gases to sterilize, purify and dehydrate the same.

The apparatus used in the treatment of gases is akin to the apparatus shown and described in my United States Patents Nos. 1,706,594, granted March 26, 1929, and 1,736,839, granted November 26, 1929. In the method and apparatus described and claimed in those patents, the sterilization of compressed air was discussed, but it has been found that the treatment of gases could not be accomplished successfully in the manner described in said patents, but that certain definite changes were necessary in order to produce an apparatus which would successfully sterilize, purify and dehydrate gases of various kinds.

The primary object of the invention, therefore, is to provide a method for sterilizing, purifying and dehydrating gas.

A further object of this invention is to accomplish the first object primarily by physical means alone.

A still further object of the invention is to combine with the physical means chemical materials for assisting in the extraction of odors and acid from gas.

Another object of the invention is to provide an apparatus which, in the treatment of carbon dioxide, will not only sterilize, deodorize and dehydrate said gas, but will extract materials entrained therein.

A further object of the invention is to provide a unitary apparatus for accomplishing all of these purposes.

According to the invention, the method consists of first compressing a gas, then successively expanding same into the bottom of each of a series of containers of gradually increasing volume, and removing the condensation from one or more of said containers. One or more of the containers may also be provided with impedimenta in the form of baffles or other means which contact the gas causing it to take a tortuous course and deposit entrainment thereon. The gas under treatment may also be passed through a container having chemical material therein, such for instance, as charcoal for assisting in extracting odors. One or more of the containers may also be provided with material in the form of chemicals and, for instance, limestone for extracting acid from the gas under treatment.

The drawing illustrates embodiments of the invention and the views therein are as follows:

Figure 1 is a diagrammatic view showing a unitary system for receiving gas under pressure and for treating the same to sterilize, purify and dehydrate same, and Figure 2 is a similar view showing a modified apparatus.

As illustrated in the drawing, gas under pressure is conveyed from the source through a pipe 6 to a container 7. An expansion valve 8 controls the admission of the gas from said pipe to said container, and this expansion valve is, of course, adjustable. The expansion valve 8 is located at or very near to the bottom of the container 7, while a take-off pipe 9 communicates with the upper end of said container and also with the bottom of a container 11 of larger diameter than the container 7. This pipe 9 is also provided with an expansion valve 12 which admits the gas from the pipe 9 into the container 11. At or near the top of the container 11 is another pipe 13 leading in like manner to the bottom of a container 14 with an expansion valve 16 admitting the gas from the pipe 13 to said container. Another pipe 17 communicates with the upper end of the container 14 and with the lower end of a container 18, while the gas is again admitted to said container 18 through an expansion valve 19.

While in the present instance I have shown and described four expansion containers it will be understood that either more or less containers may be used. It was found in some instances in connection with the sterilization of air that three containers were sufficient. In the present instance some gases may require additional containers while still other gases may require less number than that shown and described herein. The apparatus here shown, one which has been successfully used in the sterilization, purification and dehydration of carbon dioxide gas, in connection with the manufacture of dry ice and changing conditions, will necessitate more or less containers.

The container 21 as shown at the right of the train is a storage container and a pipe 22 communicates with the top of the container 18 and the top of the container 21. From the storage container 21 a pipe 23 may lead to the point of use of the gas. In the present diagrammatic view there is shown at the top of each container a gauge 24 and a plug 26 which may be removed for the insertion of a thermometer when it is required to check the temperature of the gas in any container.

As shown in the drawing, a pipe 27 leads from the bottom of each of the containers 7, 11, 14, 18 and 21. These pipes may connect with a header 28 which may either run to the source of supply of the gas or to the scrubbers through which the same has been passed prior to entering the inlet pipe 6. By this arrangement any gas which escapes from the containers into the header will be returned to the source of supply, or into the system. Each of the containers may be provided with a pet-cock 29 for taking samples of the gas throughout the system.

One or more of the containers may be provided with means for collecting entrainment from the gas under treatment. In the present instance, a series of baffles 31 has been shown in the containers 14 and 18, but it will be understood that this method of illustration does not constitute a limitation because only one or all the containers may be provided with the means for causing the gas under treatment to take a tortuous course in its passage through the container, and other means and baffles may be used.

In Figure 2, the apparatus illustrated is substantially the same as that shown in Figure 1, except that there has been introduced between the container 18 and the storage container 21 two containers 32 and 33. These containers each have a removable top 34 and a perforated or wire basket 36 fits therein. As illustrated, one of these baskets may be provided with material for extracting odors from the gas under treatment, and the other provided with material for extracting acid from the same. It will, of course, be understood that the perforated baskets have been shown in the illustration because it has been found that charcoal may be used for the first purpose and limestone may be used for the second, but it is to be understood that the baskets may be dispensed with and the materials deposited into the containers themselves, or chemical materials may be introduced into these containers and the gas under treatment passed directly therethrough.

The present invention is designed for the treatment of gases indiscriminately, and for the sterilization, purification and dehydration thereof. Many gases used commercially may be physically treated by this method and with the apparatus shown in the drawing, for instance, carbon dioxide gas for the manufacture of dry ice, hydrogen gas for carbonization purposes, oxygen gas used in therapeutic work, etc.

The apparatus here shown has been tested in connection with the commercial manufacture of dry ice, and it has been proven that all living organisms have been destroyed. The repugnant odors have been eliminated, and carbon dioxide gas containing in the raw four hundred milligrams of moisture per cubic foot after treatment contained but three milligrams per cubic foot. The succesful operation in connection with the various gases requires that the capacities of the various containers be carefully checked for the best results. In the treatment of carbon dioxide gas it is suggested that the containers be approximately seven feet in height and that they increase in diameter approximately four to six inches.

The efficacy of this system for air sterilization was definitely proven in the case of Schiller et al. v. Robertson, Commissioner of Patents, 28 F. (2d) 301, but it was found that definite changes were required for sterilizing, deodorizing and dehydrating gases. The invention has advanced beyond the stage of experimentation and has been proven feasible in connection with the commercial manufacture of dry ice.

When the word "purification" is used throughout this specification, it embodies the removal of objectionable odors and all entrainment carried by the gas under treatment.

Of course, the apparatus illustrated and described herein may be modified in various ways without departing from the invention herein set forth and hereafter claimed.

The invention is hereby claimed as follows:

Apparatus for sterilizing, purifying and dehydrating compressed gas comprising a series of cylindrical containers of successively increased volume, communicating connections between the successive containers arranged so that the gas is introduced into the bottom and discharged from the top of each container, expansion valves in said connections at the point gas is admitted into each container, the diameter of the smallest container being less than twelve inches, and the diameter of successive containers being increased from four to six inches.

JOSEPH F. SCHILLER.